US005855779A

United States Patent [19]

Lee et al.

[11] Patent Number: 5,855,779

[45] Date of Patent: Jan. 5, 1999

[54] APPARATUS FOR MOUNTING A COVER PLATE TO A WATER PURIFIER

[75] Inventors: Deok-Hye Lee, Incheon; Deok-Joong Yoon, Suwon, both of Rep. of Korea

[73] Assignee: Samsung Electronics Co., Ltd., Suwon, Rep. of Korea

[21] Appl. No.: 777,391

[22] Filed: Dec. 27, 1996

[30] Foreign Application Priority Data

Dec. 30, 1995 [KR] Rep. of Korea .................. 1995-54909

[51] Int. Cl.[6] .................................................. B01D 35/027

[52] U.S. Cl. ........................ 210/232; 210/246; 210/257.1

[58] Field of Search .................................... 210/232, 244, 210/246, 257.1, 257.2

[56] References Cited

U.S. PATENT DOCUMENTS

| | | | |
|---|---|---|---|
| 3,817,381 | 6/1974 | Heskett et al. | 210/284 |
| 3,997,751 | 12/1976 | McNally | 210/146 |
| 4,049,550 | 9/1977 | Obidniak | 210/152 |
| 4,784,763 | 11/1988 | Hambleton et al. | 210/258 |
| 5,112,477 | 5/1992 | Hamlin | 210/257.1 |
| 5,266,170 | 11/1993 | Weber et al. | 210/459 |

*Primary Examiner*—W. L. Walker

*Attorney, Agent, or Firm*—Burns, Doane, Swecker & Mathis, L.L.P.

[57] ABSTRACT

A water purifier includes water filters and a storage tank for purified water, all contained within a housing. Access to the housing interior is afforded by means of a cover plate that is hinged to the housing along a lower edge of the cover plate. Mounted on the cover plate adjacent an upper edge thereof are two push-button actuated latches which releasably secure the cover plate to the housing. The latches are disposed at opposite sides of the cover plate and each latch comprises a plate spring that is inherently biased to a latching position. A push button is provided for each latch to enable a user to flex the latches to their unlatching positions.

8 Claims, 6 Drawing Sheets

FIG. 6
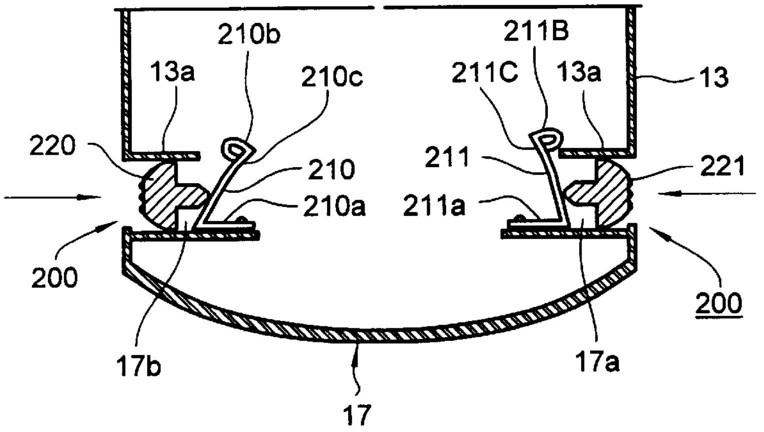
FIG. 7
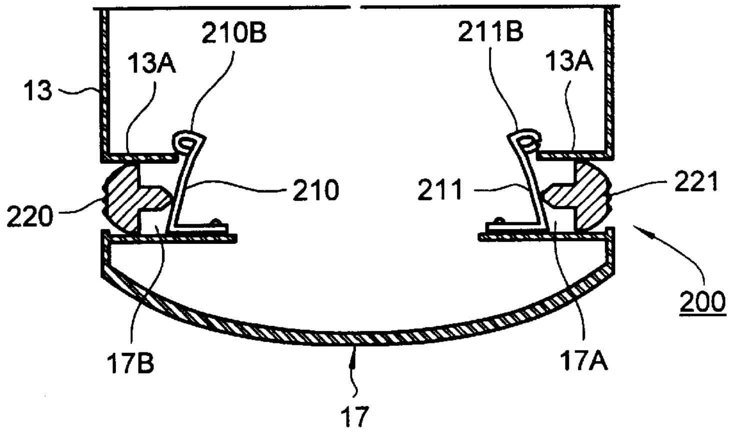
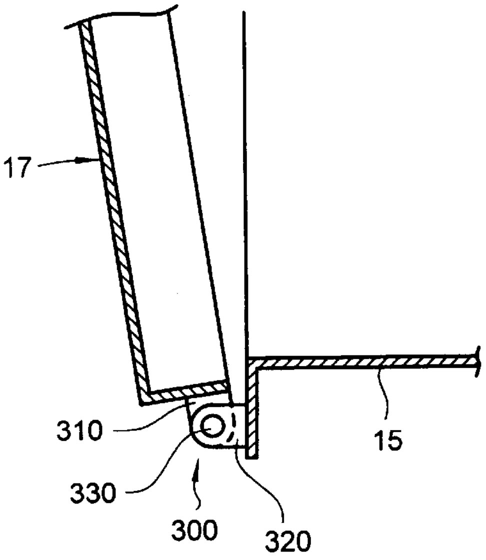
FIG. 8

APPARATUS FOR MOUNTING A COVER PLATE TO A WATER PURIFIER

BACKGROUND OF THE INVENTION

1. Field of the Invention

This invention relates to a front panel of a water purifier.

2. Description of the Conventional Art

A conventional cold and hot water purifier is generally designed such that the fresh water supplied from a fawcet is purified after separated from foreign objects and the like via special filtering means.

The cold and hot water purifier is divided into a natural filtration type, a direct filtration type, an ion exchange resin type and a reverse osmosis type according to purifying methods.

The cold and hot water purifier employing a reverse osmosis type is to purify water by removing heavy metals, bacteria and carcinogenic substances via an artificial osmotic membrane under a predetermined pressure. Also, the water purifier is used to purify the water used for washing and cleaning special elements in fields such as ultramodern science or precision science. The water purifier device is used to purify water used for drinking and cooking and the like in view of the protection of environment.

As shown in FIGS. 1 to 3, the reverse osmotic type cold and hot water purifier includes a main body 10 having a front panel 11, a back panel 12, a side panel 13, an upper panel 14 and a lower panel 15.

Water retaining means 16 is located at a middle portion of the front panel 11 for retaining water dropped from a cold and hot water extracting spigot or valves 130,131 and the water retained at the water retaining means 16 is drained manually or by a drain hose (not shown) connected to a predetermined portion of the water retaining means 16.

As shown in FIGS. 2 and 3, predetermined spaces E and F are formed at upper and lower sides of the main body 10 by first and second partitions 20,21.

A third partition 22 is vertically located between the first and second partition 20,21 so as to provide a special space G to a backside of the main body 10.

A fourth partition 23 is horizontally located at a predetermined height on a front side of the third partition 22 so as to provide predetermined spaces H,I between the first and second partition 20,21.

In the space E, a water installing chamber 30 is disposed on an upper surface of the first partition 20. The water storing chamber 30 is able to store purified water of desired guantity. Also, a control box 40 for selectively controlling an operation of the water purifier is fixed at one side of the front panel 11.

In the space F, a compressor 50 for compressing refrigerant to a high temperature and a high pressure state, is mounted on an upper surface of the lower panel 15. A condenser 60 is also mounted at the other side of the upper surface of the lower panel 15. The condenser 60 is able to perform a condensing action on a pressurized refrigerant received from the compressor 50. Cooling means 70 (for example, fan, blower, etc.) for cooling the compressor 50 and condenser 60, is located at a middle section of the upper surface of the lower panel 15.

In the space G, a plurality of filtering means 90 are supported by first and second filter fixing brackets 80,81. Also, a pressurizing pump 100 is disposed at an upper side of the second partition 21.

As shown in FIG. 4, the plurality of filtering means 90 comprise a sedimenting filter 91 fixed through the medicm of a first filter fixing bracket 80, for removing floating matters (rust materials remaining at water passage) when unpurified water passes through the passage; a pre-processing filter 92 for removing foreign materials (for example, chlorine components, etc.) contained in the fresh water supplied from the sedimenting filter 91; a first and a second membrane filters 93,94 for removing various heavy metals or carcinogenic substances contained in the fresh water via a the pressurized pump 100 from the pre-processed filter 92; post-processing filter 95 for removing noxiousness gaseous components or a bad smell of the water via the first and the second membrane filters 93,94; and, a sterilizing filter 96 fixed by a second filter fixing bracket 81, for sterilizing noxious germs contained in the water after passing the post-processing filter 95.

Hoses 97 for guiding flow of the water, are interconnected to the sedimenting filter 91, the pre-processing filter 92, the first and the second membrane filters 93,94, the post-processing filter 95 and the sterilizing filter 96, respectively. Also, a concentrated water pipe 98 is connected to a lower side of the first and the second membrane filters 93,94 so that concentrated (waste) water discharged from the first and the second membrane filters 93,94 is discharged to the outside.

In the space H, a warm water container 110 and a cold water container 120 are disposed on an upper surface of the forth partition 23. After heating or cooling the purified water provided via first and second purifying pipes 31,32 from a purified water container 30, the warm water container 110 and cold water container 120 are provided with hot water and cold water respectively.

As shown in FIG. 3, the first purified water pipe 31 is coupled to a bottom surface of the purified water container 30 and a bottom surface of the warm water container 110. A second purified water pipe 32 is mounted at the other side of the bottom surface of the purified water container 30 and the cold water container 120, respectively.

A heating member 111 is inherently inheemtly disposed at the warm water container 110. The heating member 111 serves to heat the water contained at the warm water container by using an external power (not shown).

A cooling coil 121 is spirally wound on a circumference of the cold water container 120. The cooling coil 121 contains a liquid refrigerant to cool the purified water contained in the cold water container 120.

Water exhausting pipes 112,122 are respectively coupled with the warm water container 110 and the cold water container 120. The water exhausting pipes 121,122 are connected to warm and cold water dispensing valves 130, 131 projecting through the front panel 11.

As shown in FIGS. 5 and 6, the warm water and the cold water extracting valves 130,131 include an extracting body 133 having a valve for dispensing the warm and cold water. Bodies 133 are engaged with the water exhausting pipe 112 of the warm water container 110 and the water exhausting pipe 122 of the cold water container 120, respectively.

In the space I, a main PCB (Printed Circuit Board)(140) having various control functions for controlling an operation of the purifier, is disposed on an upper surface of the second partition (21).

When a selecting button (not shown) mounted at the control box 40, is pushed by the user, the pressurizing pump 100 is operated. At this time, the water is purified via a plurality of filtering means 90 under a predetermined pressure according to the operation of the pressurizing pump 100.

When the water supplied from the faucet is passed through the deposition filter 91, the floating materials contained in the water are removed. After passing through the deposition filter 91, chlorine components in the water are also removed while passing through the pre-processed filter 92. The heavy metals and/or carcinogenic substances are removed by passing the water through the first and the second membrane filters 93,94.

When the water is passed through post-processing filter 95 after passing through the first and the second membrane filters 93,94, bad smell or noxious gas components contained in the water is removed and lost. Also, noxious bacteria contained in the water is removed by passing the water through the sterilizing filter 96. After the sterilizing filter 96, the water is stored in the purified water container 30.

A purified water contained in the purified water container 30 is provided to the warm and the cold water containers 110, 120 via the first and the second purifying water pipes 31,32, respectively. That is, the purified water which flows through the first purifying water pipe 31 is continuously provided to a bottom position of the warm water container 110 and the purified water which flows through the second purified pipe 32 is also continuously provided to a top position of the cold water container 120.

When the water is filled in the warm water and the cold water containers 110,120, an operation of the pressurizing pump 100 is stopped upon receipt of sensing signals from a water level protecting sensor (not shown). That is, the water level protecting sensor is adjusted and controlled by the level of the water to prevent the water in the warm water and the cold water containers 110,120 from overflowing.

When the heater member 111 disposed in the warm water container 110 for providing the warm water is operated, the water is heated to a predetermined temperature. When the compressor 50 is operated to supply the cold water, vaporous refrigerant gas in a high temperature and high pressure state is provided to condenser 60. Also, the refrigerant gas which flows in an inner part of the condenser 60 is condensed by an air blast according to an operation of the cooling means 70.

At this time, the condensed vaporous refrigerant gas having passed through the condenser 60 is turned into gaseous refrigerant having a higher temperature than room temperature which is an amibient temperature of the cold and warm water purification device. The pressure of the refrigerant gas is decreased in pressure in passing through a capillary tube (not shown). The refrigerant gas is expanded by the cooling coil 121 wound around a circumference of the cold water container 120 so that the water in the cold water container 120 is cooled.

If a user wants to dispense the warm water or the cold water contained in the warm water and the cold water containers 110,120, he or she pushes an extracting lever 136 with a container (for example, a cup). When the extracting levers 136 are pushed backward, channels of respective extracting valves 130,131 are opened. When the extracting valves 130,131 are opened, the warm and the cold water in the warm water and the cold water containers are dispensed, respectively.

In the conventional warm and cold water purifier, a cover plate 17 disposed underneath the water retaining means 16 of the front panel is closely connected to front edges of side panel 13 and is fastened by a plurality of engaging screws (not shown). Thus, it is time consuming to open and close the front panel 17, and there is a risk of the screws becoming worn.

SUMMARY OF THE INVENTION

One of the principal objects of the present invention is to provide a water purifier with means for easily attaching and detaching a cover plate thereon by an elastic force.

A further object of the invention is to provide a front panel of a water purifier having an attractive outer appearance.

According to the present invention, there is provided a water purifier employing a cover plate and means for easily attaching and detaching the cover plate. The attaching and detaching means is actuable by a pushing action applied against an elastic spring by a plurality of push buttons.

Additional objects and features of the invention are set forth in the following description of the preferred embodiment of the invention.

BRIEF DESCRIPTION OF THE DRAWINGS

FIG. 6 is a sectional view showing an unlatched state of the cover plate according to the present invention.

FIG. 7 is a sectional view showing a closed state of the cover plate according to the present invention.

FIG. 8 is a sectional view showing a rotated state of a lower end of the front panel according to the present invention.

DESCRIPTION OF THE PREFERRED EMBODIMENT

The present invention will now be described in more detail with reference to the accompanying drawings.

Figure 1:
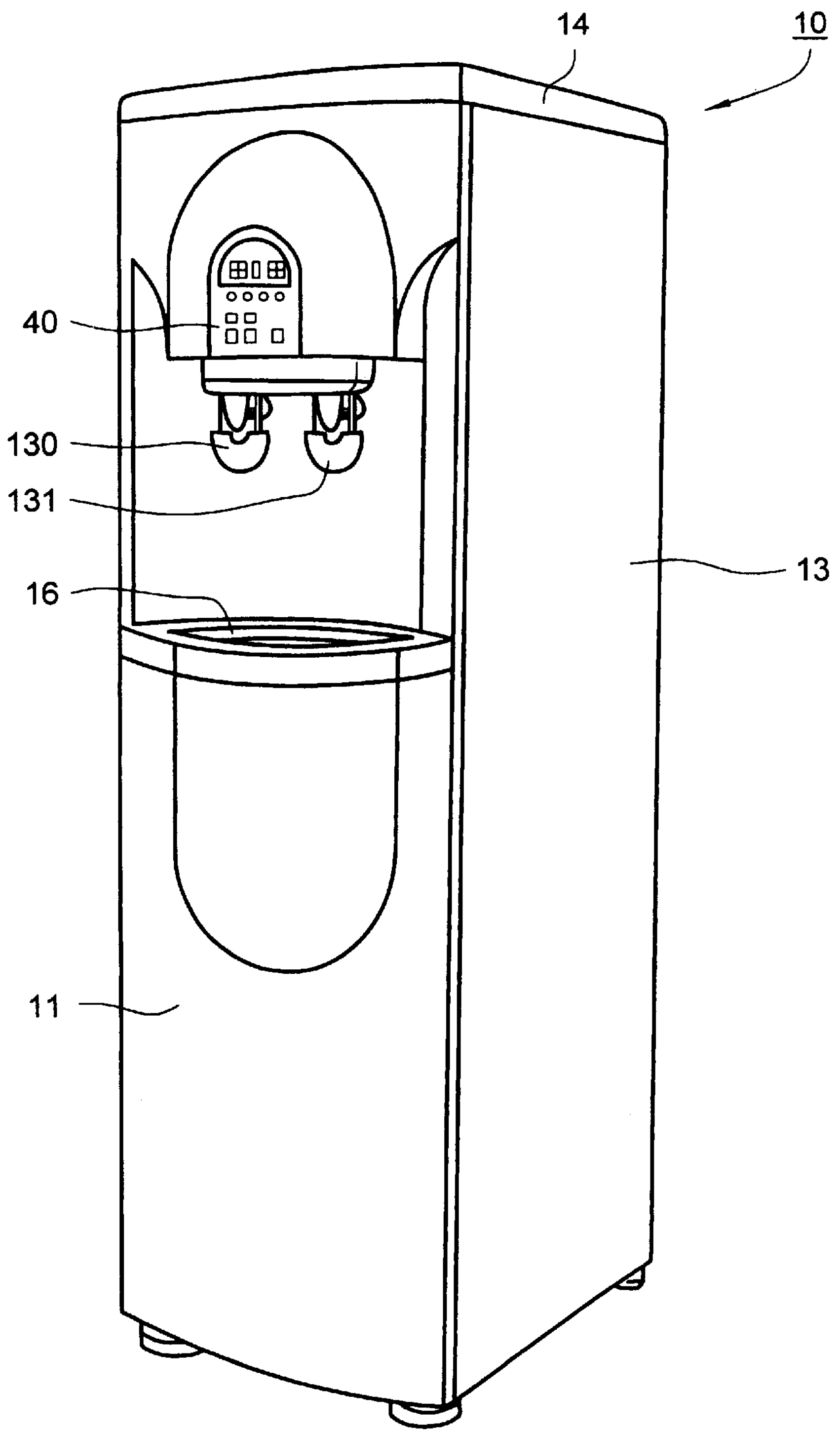
FIG. 1 (PRIOR ART)
FIG. 1 is a perspective view of a conventional water purifier.
Figure 2:
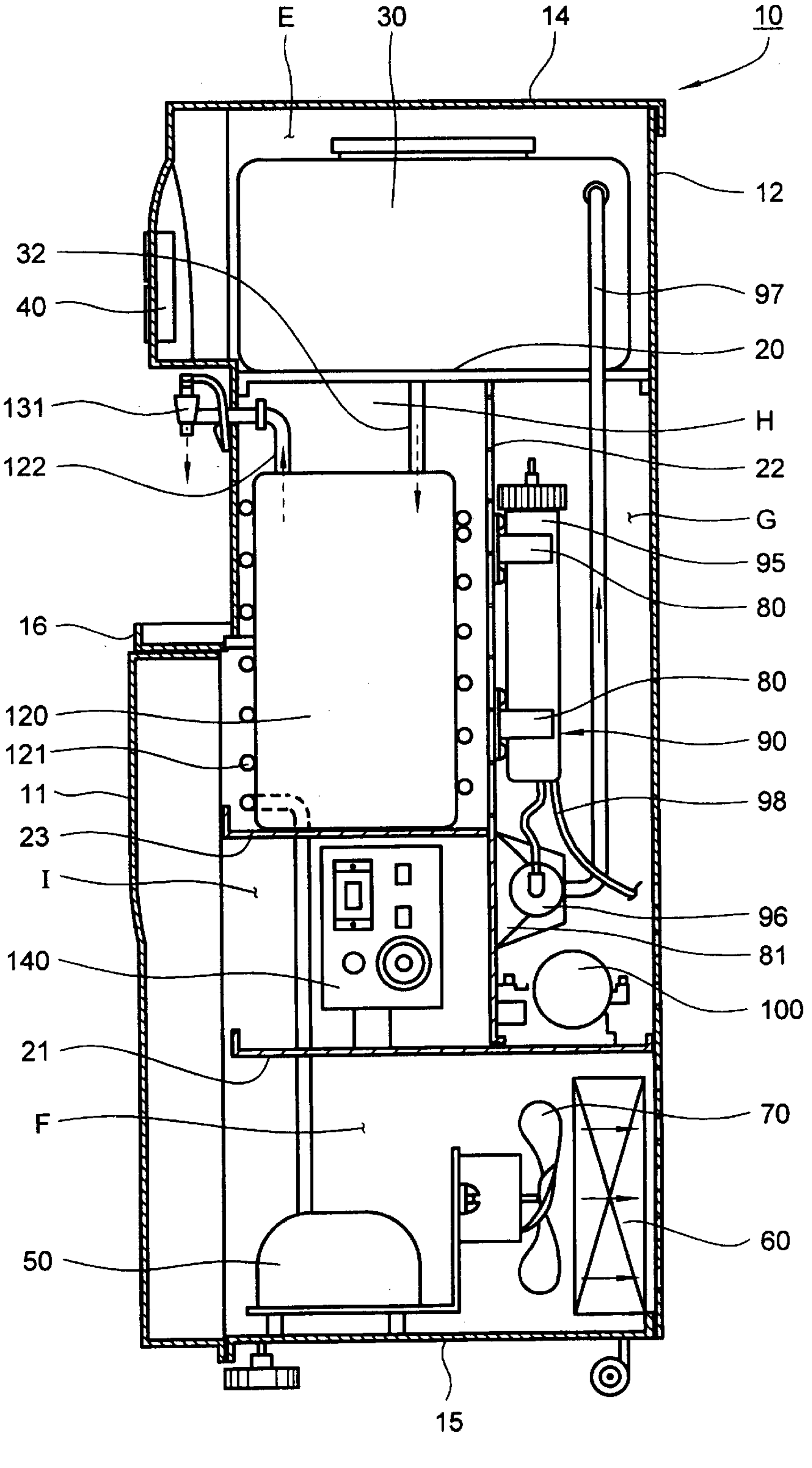
FIG. 2 (PRIOR ART)
FIG. 2 is sectional view showing one side of the conventional water purifier.
Figure 3:
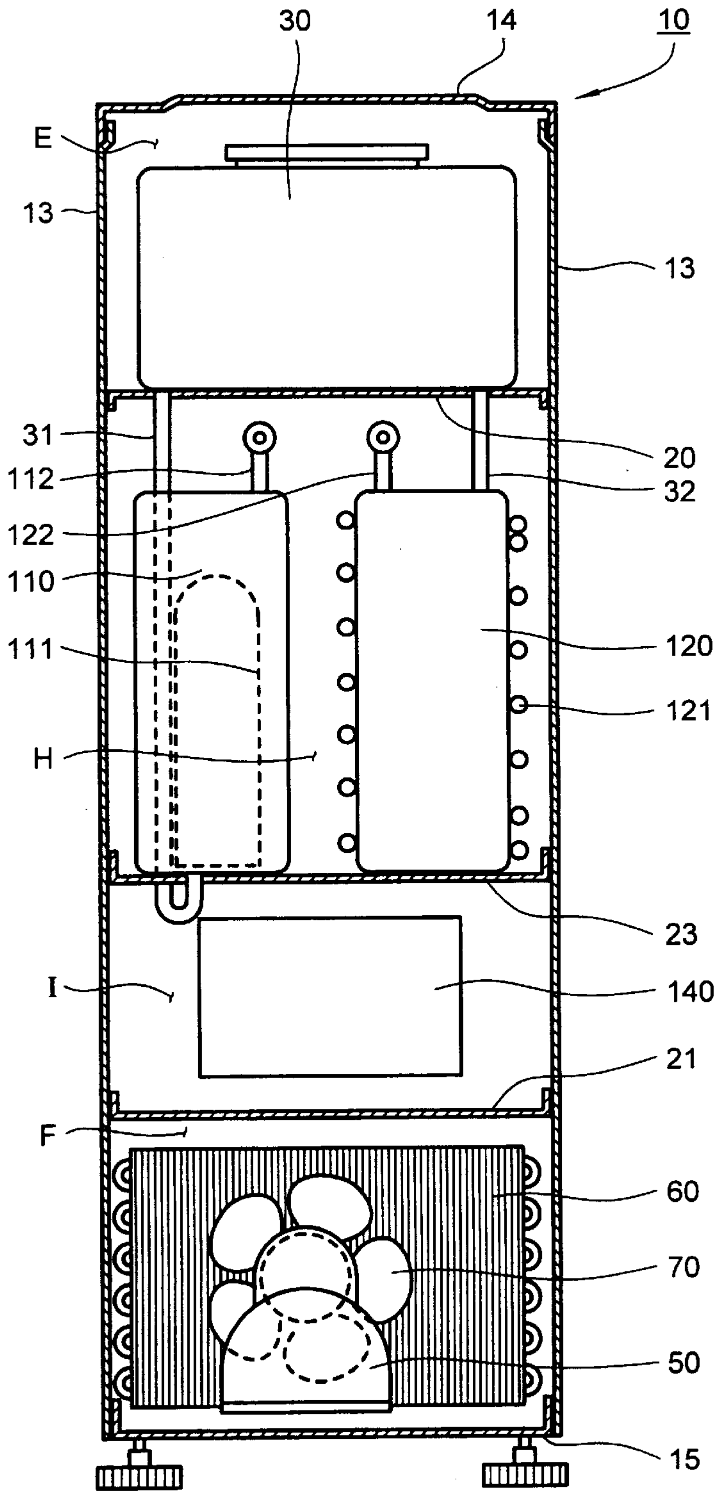
FIG. 3 (PRIOR ART)
FIG. 3 is a sectional view showing a front side of the conventional cold and warm water purifier.
Figure 4:
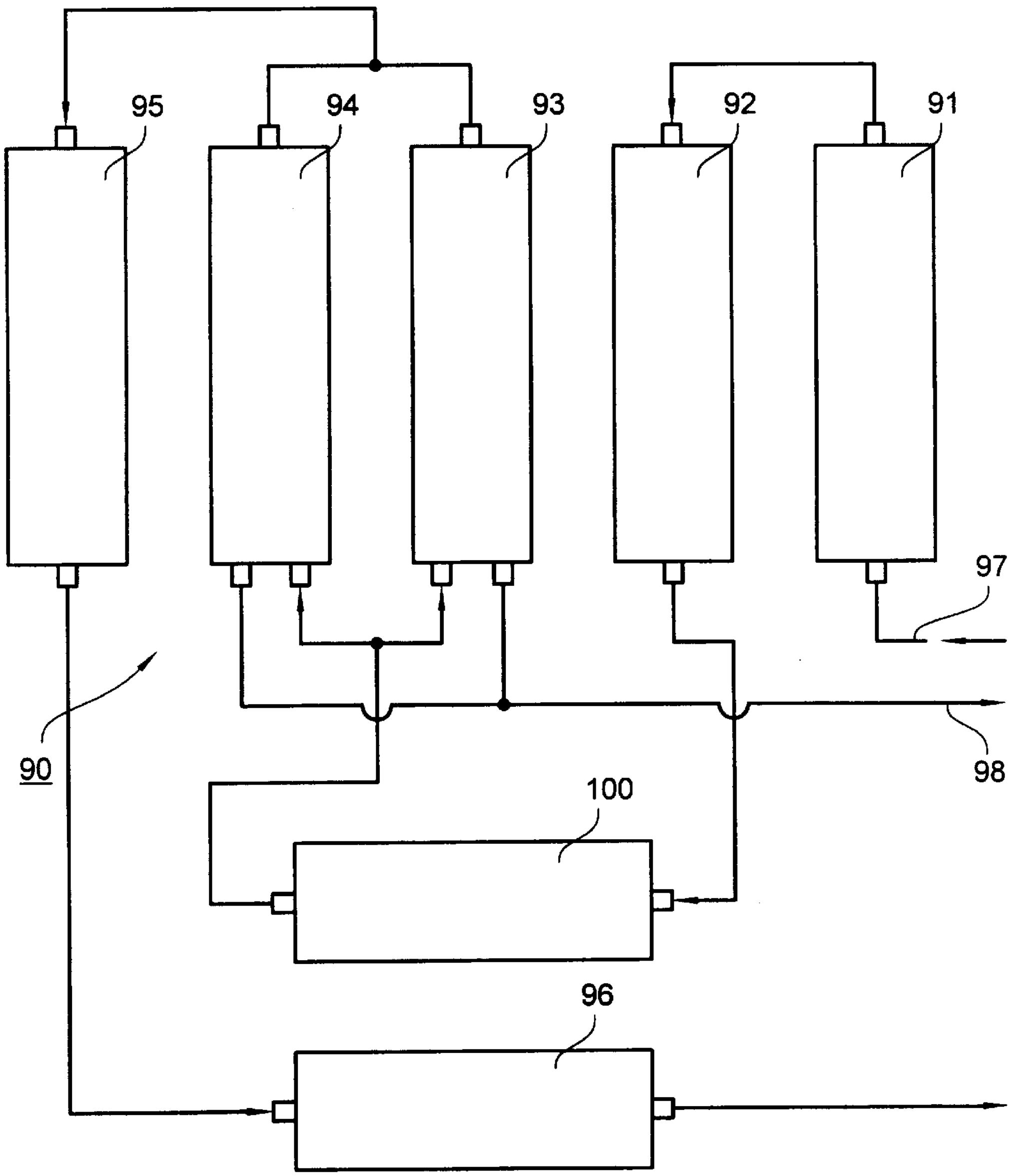
FIG. 4 (PRIOR ART)
FIG. 4 is a block diagram showing an arrangement of conventional filter means and pressurizing pump.
Figure 5:
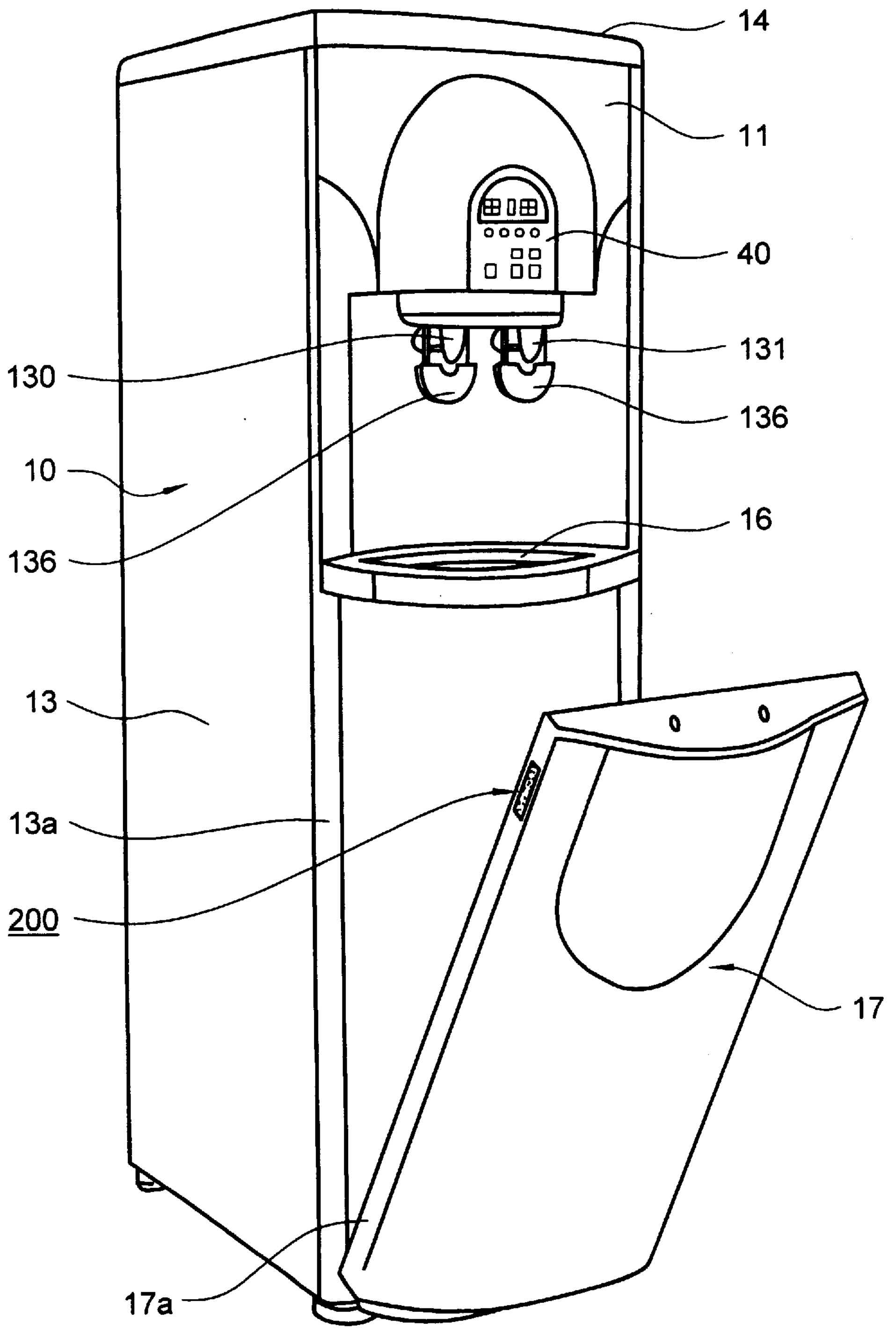
FIG. 5 is a perspective view showing an opened state of a cover plate according to a preferred embodiment of the present invention.

In FIG. 5, reference numeral 200 is cover plate attaching and detaching means formed at an upper end of the cover plate 17. The cover plate attaching and detaching means 200 is attached and detached relative to side panels 13 by a pushing action according to an elastic biasing force.

As shown in FIGS. 6 and 7, the cover plate attaching and detaching means 200 includes a pair of spring latches comprised of a first and a second plate spring 210,211 respectively mounted within the cover plate 17, and a first and a second push button 220,221 slidingly disposed with respective channels, 7*a*, 17*b* for retracting the first and the second spring 210,211, respectively.

One end 210*a*,211*a* of the first and the second plate spring 210,211 is bent at a right angle and is connected and engaged with side portions of the channels 17*a*,17*b* of the cover plate 13. The other end 210*b*,211*b* of the first and the second plate spring 210,211 forms a protrusion engageable behind a flange 13*a* of side panels 13 when the springs are at rest, as shown in FIG. 7.

The first and the second push buttons 220,221 are contacted by a center portion 210*c*,211*c* of the first and the second plate spring 210,211 in order to enable the first and the second springs 210,211.

In FIG. 8, reference numeral 300 is a rotary mounting for the cover plate disposed at a lower end of the cover plate 17 so as to enable the cover plate 17 to be swung toward or away from the lower panel 15 during attaching and detaching operations respectively of the cover plate attaching and detaching means 200.

That is, the cover plate mounting 300 includes a first hinge piece 310 protruded from a lower end of the cover plate 17, a second hinge piece 320 protruding from a front side of the lower panel 15, and a hinge pin 330 for connecting the first and the second hinge pieces 310,320 together.

The operation of the front panel attaching and detaching apparatus according to the present invention will be explained hereinafter.

To open the cover plate 17, the first and second push buttons 220,221 are inwardly pushed by the user, whereby the first and the second plate springs 210,211 are elastically flexed inwardly, so that the protrusions 210*b*,211*b* are separated from the bent flange 13*a* of both of the side panels 13. Then, the cover plate 17 can be swung open.

To close the cover plate 17, the cover plate is rotated clockwise until the protrusion 210*b*,211*b* of the first and the second springs 210,211 become engaged behind the flanges 13*a* according to tensile actions of the first and the second springs 210,211 as shown in FIG. 7.

At this time, the first and the second push buttons 220,221 are pushed outwardly within their respective channels 17*b* by the springs. Outer surfaces of the first and the second push buttons 220,221 do not project outwardly from side panels 13,13 and thus help maintain the water puritier with a good exterior appearance.

Although the invention has been described in its preferred form with a certain degree of particularity, it is understood that the present disclosure of the preferred form has been charged in the details of construction and the combination and arrangement of parts may be resorted to without departing from the spirit and the scope of the invention as hereinafter claimed.

What is claimed is:

1. A water purifier including:

a housing;

filters disposed within the housing for purifying water;

a water storage tank disposed within the housing for storing purified water; and a cover plate mounted on the housing and being openable to provide access to the interior of the housing; and at least one latch for holding the cover plate in a closed state, the latch being manually movable to an unlatching state against a spring force, wherein the at least one latch comprises two latches, each latch comprising a plate spring having a first end attached to the cover plate, and a second end in the form of a projection, each plate spring being inherently biased to a position wherein the projection engages behind a flange of the housing to secure the cover plate in a closed state.

2. The water purifier according to claim 1, further including a pair of push buttons mounted on the cover plate and engageable with respective plate springs for flexing the plate springs to an unlatching position when the push buttons are pushed by a user.

3. The water purifier according to claim 2 wherein the push buttons are aligned with one another in a horizontal direction and are mounted at respective ones of horizontally spaced vertical edges of the cover plate.

4. The water purifier according to claim 2 wherein the cover plate is mounted for rotation along one edge thereof, the latches disposed adjacent an opposite edge of the cover plate.

5. The water purifier according to claim 1 wherein the cover plate is mounted for rotation along one edge thereof, the latches disposed adjacent an opposite edge of the cover plate.

6. The water purifier according to claim 5 wherein the cover plate is mounted for rotation about a horizontal axis at a lower edge of the cover plate.

7. The water purifier according to claim 6, further including a first hinge piece mounted on the housing, a second hinge piece mounted on the cover plate, and a hinge pin interconnecting the first and second hinge pieces, to define the rotatable mounting of the cover plate.

8. The water purifier according to claim 1 wherein the cover plate comprises part of a front panel attached to the housing.

* * * * *